Patented Sept. 6, 1932

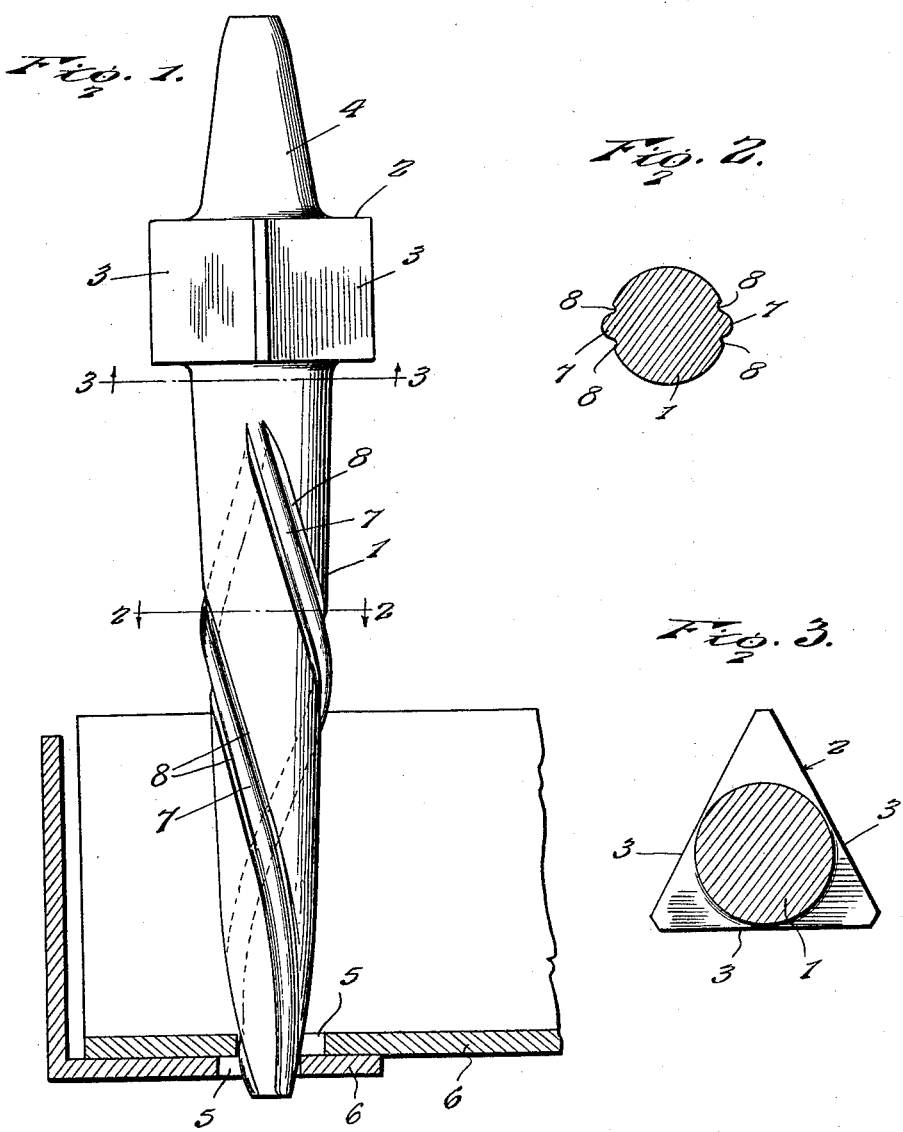

1,876,021

UNITED STATES PATENT OFFICE

MICHAEL F. QUIGLEY, OF PORT RICHMOND, NEW YORK

DRIFT PIN

Application filed August 28, 1929. Serial No. 389,025.

The present invention is directed to improvements in drift pins.

An object of the invention is to provide a pin of this character so constructed that the bolt or rivet openings formed in sheet metal units, such as girders, boiler plates and the like, can be quickly brought into true registration to permit the bolts or rivets to be freely placed in the openings for securement.

Another object of the invention is to provide a device of this character so constructed that it can be placed upon a slightly inclined surface and will be prevented from rolling therefrom. Pins for this purpose have heretofore been formed circular in cross section and when placed upon an inclined surface or ledge ofttimes roll off and are lost, or dropped from one level to another upon workmen below, and it is to overcome such defects that the present invention has been perfected.

Another object of the invention is to provide a device of this character having means carried whereby to retain the pin in the holes of the unit when alining said holes and thereby prevent the drift pin from being forcibly ejected from the hole and striking or otherwise injuring the operator or workmen in the vicinity.

With these and other objects in view, the invention resides in the novel features of construction, and the combination and arrangement of parts to be hereinafter more fully described, claimed and illustrated in the accompanying drawing, in which:

Figure 1 is a side elevation of the device showing the same in position for placing openings of metal units in registration.

Figure 2 is a sectional view on line 2—2 of Figure 1.

Figure 3 is a sectional view on line 3—3 of Figure 1.

Referring to the drawing, 1 designates the shank of the pin which is tapered and is provided at its small end with a flat blunt terminal and at its major end with an integral enlargement 2, said enlargement being preferably triangular in cross section to provide flat faces 3, the purpose of which will be later explained.

The enlargement 2 has a head 4 rising therefrom for receiving the impact of blows from a sledge in order that the shank can be driven into the openings 5 of the metal units 6, the tapered formation of the shank obviously causing the openings to be brought into proper registration for the reception of the bolts or rivets.

The shank 1 is further provided with a pair of spirally disposed ribs 7, which extend from the minor end of the shank to a point near the enlargement 2, said shank having grooves 8 extending along the sides of the ribs for their entire length. The ribs are preferably curved transversely and are of such size that the outer surface thereof will extend slightly beyond the outer surface of the shank, as clearly shown in Figure 2.

The ribs 7 will bite into the walls of the openings 5 and will prevent the pin from disengaging the same when resistance of the unit in a direction reverse to the spreading action is imparted thereto. As the drift pin is driven into the openings 5, the metal at the walls of the openings will be forced into the groove 8 thus forming, in effect, keyways on opposite sides of the ribs which causes the pin to follow a spiral path when driven into the openings and prevents said pin from being forcibly ejected from said openings. Thus the pin can be driven into the openings and will be retained therein when the pin is not being subjected to the impact of blows of a sledge, thereby preventing said pin from becoming lost, which frequently occurs when a smooth wall drift pin is used.

By providing the flat faces 3 it will be apparent that the pins can be placed upon an inclined surface and will be prevented from rolling, thus preventing dropping of the pins and consequent loss thereof.

Pins for this purpose are used by shipbuilders and structural iron workers, and owing to the fact that these pins heretofore have been of circular formation, many are lost due to their tendency to roll and it is to prevent such occurrences that the pin described and illustrated has been perfected. Obviously a pin having the flat faces will remain on an inclined surface, or will not roll when subjected to vibration.

From the foregoing, it is thought that the construction, operation and many advantages of the herein described invention will be apparent to those skilled in the art, without further description, and it will be understood that various changes in the size, shape, and proportion and minor details of construction may be resorted to without departing from the spirit or sacrificing any of the advantages of the invention.

What is claimed is:—

1. A tool for alining holes in metal units comprising a tapered shank having spiral ribs thereon adapted to bite into the metal at the walls of the holes when the tool is driven therein and prevent said tool from being forcibly ejected therefrom.

2. A tool for alining holes in metal units comprising a shank tapered towards one end and provided at its other end with a driving head, the tapered end of the shank being provided with spirally disposed circumferential ribs adapted to bite into the metal at the walls of the holes when the tool is driven therein and prevent said tool from being forcibly ejected therefrom.

3. A tool for alining holes in metal units comprising a tapered shank having spiral ribs defining oppositely disposed grooves following the contour of the ribs and into which the metal at the walls of the holes is forced when the tool is driven into said holes.

4. A tool for alining holes in metal units comprising a tapered shank having a driving head and provided with an intermediate angular portion, the tapered shank being provided with spirally disposed ribs defining shallow grooves following the contour of the ribs, said ribs being adapted to bite into the metal at the walls of the holes when the tool is driven therein and prevent said tool from being forcibly ejected therefrom.

5. A tool for alining holes in metal units comprising a shank substantially circular in cross section and tapered towards one end, said shank being provided with spiral ribs defining a groove on each side of each rib and following the contour thereof, said ribs being adapted to bite into the metal at the walls of the hole when the tool is driven therein and prevent said tool from being forcibly ejected therefrom.

6. A tool for alining holes in metal units comprising a shank tapered towards one end and provided at its other end with a driving head, said shank being substantially circular in cross section and provided with spirally disposed ribs extending from a point adjacent the driving head to the small end of the shank and defining oppositely disposed shallow grooves, the surface of the shank between the grooves being smooth and unobstructed.

7. A tool for alining holes in metal units comprising a shank substantially circular in cross section and having one end thereof tapered and its other end provided with a driving head, said shank being provided with a flat surface at the junction of the driving head and shank, spirally disposed ribs extending circumferentially around the exterior of the shank from a point adjacent the angular face thereof to the small end of said shank and adapted to bite into the metal at the walls of the holes when the tool is driven therein, there being grooves disposed on opposite sides of the ribs and into which the metal is forced to prevent forcible ejection of the tool from said holes.

8. A tool for alining holes in metal units comprising a shank tapered towards one end and provided with a flat blunt terminal, the opposite end of the shank being formed with a driving head, there being an angular face formed on the shank between the driving head and tapered portion thereof, and spaced spirally disposed circumferential ribs formed on the tapered portion of the shank and extending from a point adjacent the angular face to the blunt terminal of the shank, said ribs being curved transversely and adapted to bite into the metal at the walls of the holes when the tool is driven therein and prevent said tool from being forcibly ejected therefrom.

In testimony whereof I affix my signature.

MICHAEL F. QUIGLEY. [L. s.]